US010867060B2

(12) United States Patent
Neidig et al.

(10) Patent No.: US 10,867,060 B2
(45) Date of Patent: Dec. 15, 2020

(54) EVENT PREMISES MEDIA CONTROL FOR TRAINING AND PERFORMANCE

(71) Applicant: Anchored Home, LLC, Lutherville Timonium, MD (US)

(72) Inventors: Lauren Neidig, Lutherville, MD (US); Matthew Neidig, Lutherville, MD (US)

(73) Assignee: Anchored Home, LLC

( * ) Notice: Subject to any disclaimer, the term of this patent is extended or adjusted under 35 U.S.C. 154(b) by 249 days.

(21) Appl. No.: 16/016,051

(22) Filed: Jun. 22, 2018

(65) Prior Publication Data

US 2019/0392161 A1 Dec. 26, 2019

(51) Int. Cl.
| G06F 21/62 | (2013.01) |
| G09B 19/00 | (2006.01) |
| G09B 5/04 | (2006.01) |
| G06F 16/44 | (2019.01) |

(52) U.S. Cl.
CPC .......... *G06F 21/6218* (2013.01); *G06F 16/44* (2019.01); *G09B 5/04* (2013.01); *G09B 19/0038* (2013.01)

(58) Field of Classification Search
CPC ....... G06F 21/6218; G06F 16/44; G09B 5/04; G09B 19/0038
See application file for complete search history.

(56) References Cited

U.S. PATENT DOCUMENTS

| 8,332,895 | B2 | 12/2012 | Nathan et al. |
| 8,847,053 | B2 | 9/2014 | Humphrey et al. |
| 9,047,235 | B1 * | 6/2015 | Barraclough ........... G06F 15/16 |
| 9,374,607 | B2 | 6/2016 | Bates et al. |
| 9,672,213 | B2 | 6/2017 | Brown et al. |
| 9,761,151 | B2 | 9/2017 | Humphrey et al. |
| 2003/0182139 | A1 * | 9/2003 | Harris ..................... G06F 16/40 705/1.1 |
| 2005/0021418 | A1 | 1/2005 | Marcus et al. |
| 2005/0078944 | A1 * | 4/2005 | Risan ................. H04N 21/2541 386/213 |
| 2006/0053080 | A1 * | 3/2006 | Edmonson ............. G06Q 30/06 705/59 |
| 2006/0195902 | A1 * | 8/2006 | King ....................... H04L 67/06 726/21 |
| 2007/0055743 | A1 * | 3/2007 | Pirtle ..................... H04L 67/06 709/217 |
| 2007/0083467 | A1 * | 4/2007 | Lindahl ................ H04N 21/835 705/50 |
| 2007/0083556 | A1 * | 4/2007 | Plastina ................. G06Q 10/10 |
| 2007/0089132 | A1 | 4/2007 | Qureshey et al. |
| 2007/0244986 | A1 | 10/2007 | Svendsen |
| 2007/0288470 | A1 | 12/2007 | Kauniskangas et al. |
| 2008/0032723 | A1 | 2/2008 | Rosenberg |
| 2008/0050715 | A1 * | 2/2008 | Golczewski ......... G06Q 20/102 434/350 |

(Continued)

*Primary Examiner* — Techane Gergiso
(74) *Attorney, Agent, or Firm* — Royal W. Craig; Gordon Feinblatt LLC

(57) ABSTRACT

A system can include a server connected to a public media system in a public event premises. The system can provide a relatively large number of mobile devices access to and control of one or more public media systems. A permissioned user of the system can monitor performance by and enforce behaviors of other users through management of public media systems at remote public event premises.

20 Claims, 13 Drawing Sheets

(56) References Cited

U.S. PATENT DOCUMENTS

| | | | |
|---|---|---|---|
| 2009/0006542 A1* | 1/2009 | Feldman | G06F 16/4387 709/203 |
| 2009/0315670 A1* | 12/2009 | Naressi | G06F 21/10 340/5.8 |
| 2010/0081116 A1* | 4/2010 | Barasch | A63B 24/0003 434/252 |
| 2010/0273610 A1 | 10/2010 | Johnson | |
| 2011/0283236 A1 | 11/2011 | Beaumier et al. | |
| 2013/0004930 A1 | 1/2013 | Sorenson et al. | |
| 2013/0041590 A1 | 2/2013 | Burich et al. | |
| 2013/0110890 A1* | 5/2013 | Bailor | H04L 67/06 707/827 |
| 2013/0110892 A1* | 5/2013 | Wood | G06F 16/176 707/827 |
| 2013/0191454 A1 | 7/2013 | Oliver et al. | |
| 2014/0208923 A1 | 7/2014 | Bowen | |
| 2017/0199872 A1* | 7/2017 | Krasadakis | G06F 16/2456 |
| 2018/0025665 A1 | 1/2018 | Humphrey et al. | |
| 2019/0238954 A1* | 8/2019 | Dawson | H04N 1/00156 |

* cited by examiner

EVENT PREMISES MEDIA CONTROL FOR TRAINING AND PERFORMANCE

BACKGROUND

Performance activities, such as gymnastics, dance, or ice skating, are often performed in sequence with musical tracks. Event premises, such as gyms, theaters, or ice rinks often have public media systems to provide music that accompanies performances and practices. Conventional in-house media systems generally require direct cord connections or limited range Bluetooth connections and only allow one device to be connected at a given time. In some circumstances multiple groups of performance students may attempt to practice at an event premises at the same time. This can results in disputes over access to the media system. In other circumstances, a coach may be responsible for training many geographically dispersed students. The coach may frequently adjust the training routine and accompanying audio track to fit the capability levels of the students. In such cases a student may not receive an update and train to an outdated version of the audio track or the coach may not be able to observe the student's progress frequently enough to correct mistakes before the student significantly hinders her progress.

DETAILED DESCRIPTION

Figure 1:
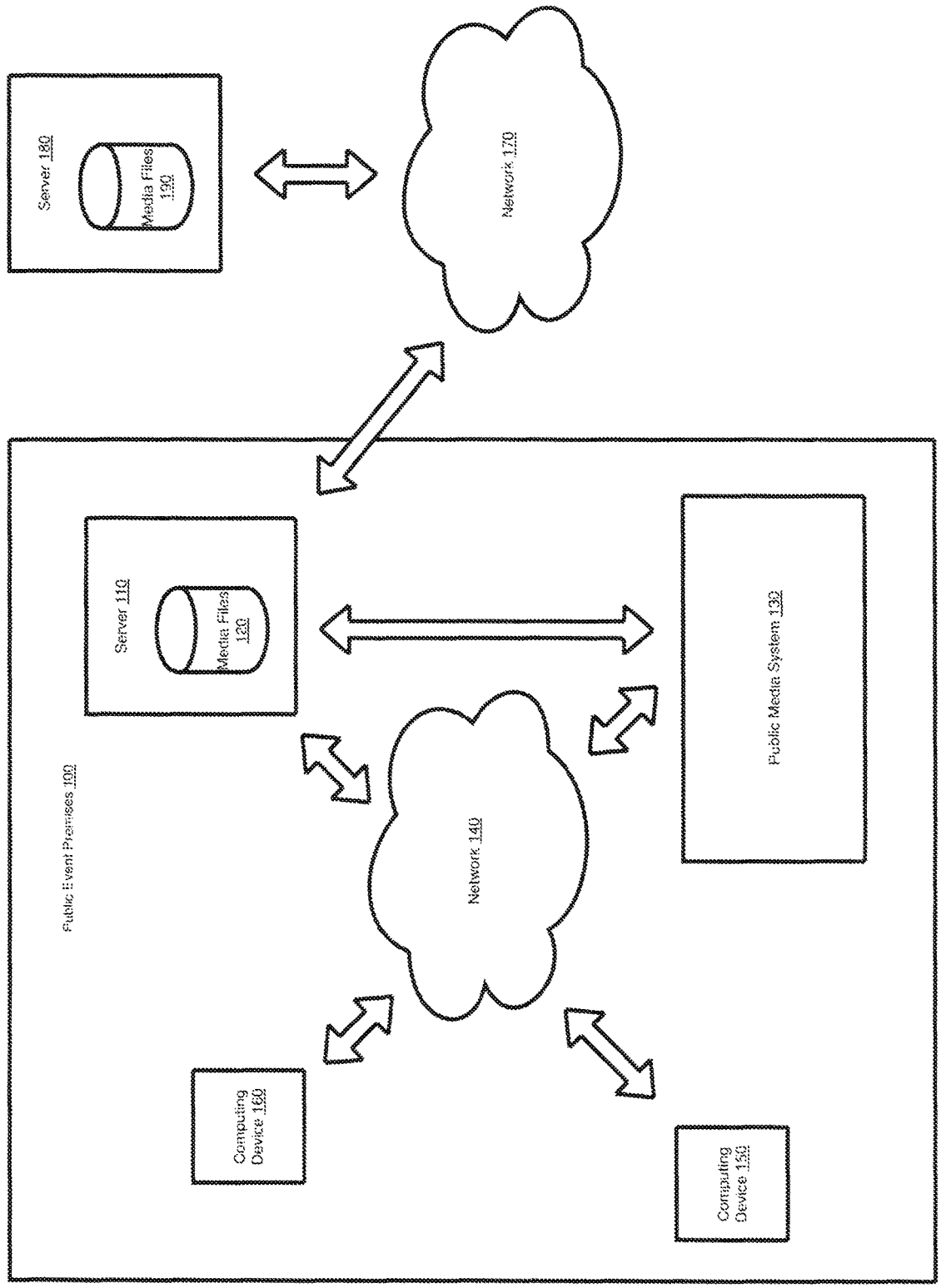
FIG. 1 shows a system diagram of an example component environment for a system, according to implementations of this disclosure.

Students and coaches in performance activities face technical problems when controlling and accessing conventional public media systems. For example, conventional public media systems do not allow more than one user to connect to the media system at a time and require either a wired or a Bluetooth connection. In conventional public media systems, when there are multiple performers, the order and sequence of media file playback must be manually negotiated directly among users. When there are many users at an event premises, a user cannot schedule an advance time slot for practice with her song without coordinating with all the other potential users at the event premises. Coaches cannot connect to and control their student's access to conventional public media systems at locations where the coach is not present because conventional public media systems are not network accessible. Further, in circumstances where a coach is geographically remote from her students and is not available to consistently monitor progress, it is not possible to automate components of student training.

To address problems related to control of a public media system at public event premises, such as those described above, implementations of this disclosure provide for techniques whereby multiple users can access a public media system, and certain users, such as coaches, can control the media access of other users, such as their students.

In an implementation of this disclosure, a server having a wireless radio can connect to and control a public media system that is installed at an event premises. The server can execute instructions to emit a wireless signal and store identifiers linked to accounts and devices, such as a coach's account and her mobile device. For example, the public event premises can be an ice rink and the coach can be an ice skating coach. When the coach's device enters the ice rink, the server can recognize the coach's device and automatically connect to it.

An application executing on the coach's device can display a list of media files, such as songs, that are stored on the server and that the coach is authorized to access. The server can store access criteria that can be used to determine which authorized accounts can control the public media system at a given time. For example, the server can store coach accounts and student accounts. The access criteria can rank certain coach accounts ahead of student accounts, and certain coach accounts over other coach accounts. For example, if students are practicing at the rink and playing songs through the public media system via their student accounts, the coach's account can take control of the public address system over the student accounts when the coach arrives. As another example, access criteria can include time windows associated with accounts. If two coach accounts are connected to the server, the coach account associated with a time window containing the current time can have priority over the coach account with a future or past time window.

The server can execute instructions to manage student access to media files selected by a coach, according to implementations of this disclosure. A coach can have multiple students that practice in geographically dispersed locations. The coach can assign the students a skating routine during an in-person training session, and the routine can be synchronized to a particular music track. However, the coach could decide to change the routine after the students had returned to their home locations, which could require shortening, lengthening, or otherwise changing the music track. The coach could set configurations for student accounts for each student that limit the media files to which the students have access. Each student's local practice rink can have an instance of the server operating in communication with the local public media system. When the coach updates the music track, the change can be enforced on each local server, such that when the student attends practice, she will have local access to the updated music track and avoid the risk of training to an outdated track.

The server can execute instructions to send and receive video files of training examples from coaches, and send, receive, and analyze video files of training performances from students, according to implementations of this disclosure. For example, a coach can upload a model training video track that demonstrates an element of a skating routine to the server. The coach can associate the model video track with the student account and the audio track to which the skating routine is to be performed. Students can access the training video track to observe how the routine element is to be performed. The students can play the accompanying audio track via their local instance of the server through the public media system and have a practice video recorded of their performance of the routine element. For example, the students can have a parent or training partner film them with the mobile device associated with the student's account. The student can then upload their performance video to their local server. The server can associate the performance video with the training video and notify the coach to review performance and evaluate whether the student had completed training of the routine element.

The server can automatically analyze whether the routine element has been adequately performed by executing instructions to compare the student's performance video to the model video, according to implementations of this disclosure. For example, the server can execute instructions to perform motion analysis operations to identify the timing and geometry of particular aspects of the student's practice video and compare the aspects to the timing and geometry of the model video. If the location or sequence of a movement of the student differs beyond a threshold amount from the location or sequence of the performer depicted in the model video, then the server can determine that the student's performance differed by a significant amount. The server can store the performance differences in an analysis file associated with the student's account. If the analysis file contains over a threshold amount of errors, the server can determine that the student did not complete the routine element and notify the student's mobile device that the student needs to try again.

Component Environment

Implementations of this disclosure may be executed in a variety of component environments. For example, FIG. 1 shows an example system diagram of a component environment, according to implementations of this disclosure. Public event premises 100 can be any premises in which a person can practice or perform an activity in conjunction with the presentation of media, such as an ice rink, a basketball facility, a theater, a football facility, a soccer facility, a boxing facility, a baseball facility, an equestrian facility, a concert hall, a civic center, a pool, a gymnasium, a dance venue, or a cruise ship.

Server 110 can store media files 120 and connect to public media system 130. Server 110 can be any combination of hardware and/or software suitable for the purposes of this disclosure, such as computing device 1200 described below with respect to FIG. 12 or servers 1330, remote platform 1370, or data stores 1350 or 1360 described below with respect to FIG. 13. In implementations of this disclosure, server 110 can operate at less than 6 volts and 300 milliamperes and use a mobile power source. A "system" as discussed herein can include a server, such as server 110, a process, procedure, computer readable media, and/or other components described in this disclosure.

Media files 120 can include one or more machine readable files of media content, such as lyrical and non-lyrical songs, ambient and noise music, rap, spoken word, verbal recitations and other audio content; images, video, graphics, and other visual content; and other sensory content suitable for the purposes of this disclosure. Server 110 can store media files 120 in a structured format such as a file system or database, an unstructured format, or any other format suitable for the purposes of this disclosure. Server 110 can connect directly or indirectly to public media system 130 by connection over any wired or wireless transmission medium suitable for the purposes of this disclosure, such as network 140 or any of the techniques discussed below with respect to FIGS. 12 and 13 for connecting computing devices and other components, such as network 1300.

Public media system 130 can be any combination of hardware and/or software suitable for the purposes of this disclosure, such as a public address system. In some implementations, server 110 can be a physically integrated component of public media system 130. In some implementations, server 110 can be physical separate and distinct from public media system 130. When connected to server 110, public media system 130 can present media files 120 to persons within public event premises 100. For example, public media system 130 can play songs to accompany the performance of ice skating routines.

One or more computing devices 150, 160 can connect over network 140 to server 110 to control access to and play back of media files 120 on public media system 130. Computing devices 150, 160 can be any combination of hardware and/or software suitable for the purposes of this disclosure, such as a mobile device, tablet, laptop, or any of the computing devices discussed below with respect to computing device 1200 in FIG. 12 or clients 1310 and 1320 in FIG. 13. Computing devices 150, 160 can be located inside or outside of public event premises 100. In some implementations of this disclosure, computing devices 150, 160 can be between 2 and 255 distinct computing devices concurrently connected to server 110.

In some implementations of this disclosure, server 110 can be in communication with server 180 over network 170. Server 180 can reside outside of public event premises 100 and can be any combination of hardware and/or software suitable for the purposes of this disclosure, such as any of those discussed above with respect to server 110. Server 180 can store media files 190 in any format suitable for the purposes of this disclosure, such as any format discussed above with respect to server 110. Media files 190 can be any machine readable media content suitable for the purposes of this disclosure, such as any of the content discussed above with respect to media files 120. Network 170 can include any combination of hardware and/or software for transmitting data over any wired, cabled, optical, or wireless transmission medium that is suitable for the purposes of this disclosure, such as the Internet, or any of the suitable techniques discussed below with respect to FIGS. 12 and 13 for connecting computing devices and other components, such as network 1300.

In some implementations of this disclosure, server 180 can be an instance of server 110 and some or all of media files 190 can be replicated versions of media files 120. In other implementations, server 180 can provide additional and/or different functionality than sever 110 and media files 190 can include additional and/or different media files than media files 120. Server 180 and media files 190 can be located in a public event premises or not located in a public event premises. In some implementations, server 180 can replace server 110 such that there is no server present within public event premises 100. In such implementations, server 180 can connect to public media system 130 from a remote location over any transmission medium suitable for the purposes of this disclosure, such as any of the techniques discussed above with respect to network 170. In some implementations of this disclosure, some or all of the operations performed on server 110 as discussed herein, may be performed instead on a server outside of a public event premises, such as server 180.

Account Relationships and Controlling Access

Implementations of this disclosure may be embodied in systems that can generate and maintain various types of accounts for users. For example, account types may include coach accounts, management accounts, student accounts, and/or administrator accounts. A particular type of account may have a particular set of permissions granting the account access to the functionality and data of the system. For example, a coach account may have permission to create and delete student accounts, upload, delete, and play media files, permit and restrict student account access to particular media files, approve student practice file submissions, advance student training progress, and so forth. A student account may have permission to play media files, upload practice files, compare practice video media files to model video media files, and so forth. Management accounts may have similar permissions as coach accounts, but may not have permissions to satisfy conditions for student training advancement and access. Administrator accounts may be restricted to a particular set of users and may have permissions to access the full functionality the system. A single user may be associated with one or more account types. In general, implementations of this disclosure may include any combination of account types and accompanying permissions suitable for the purposes of this disclosure.

Figure 2:
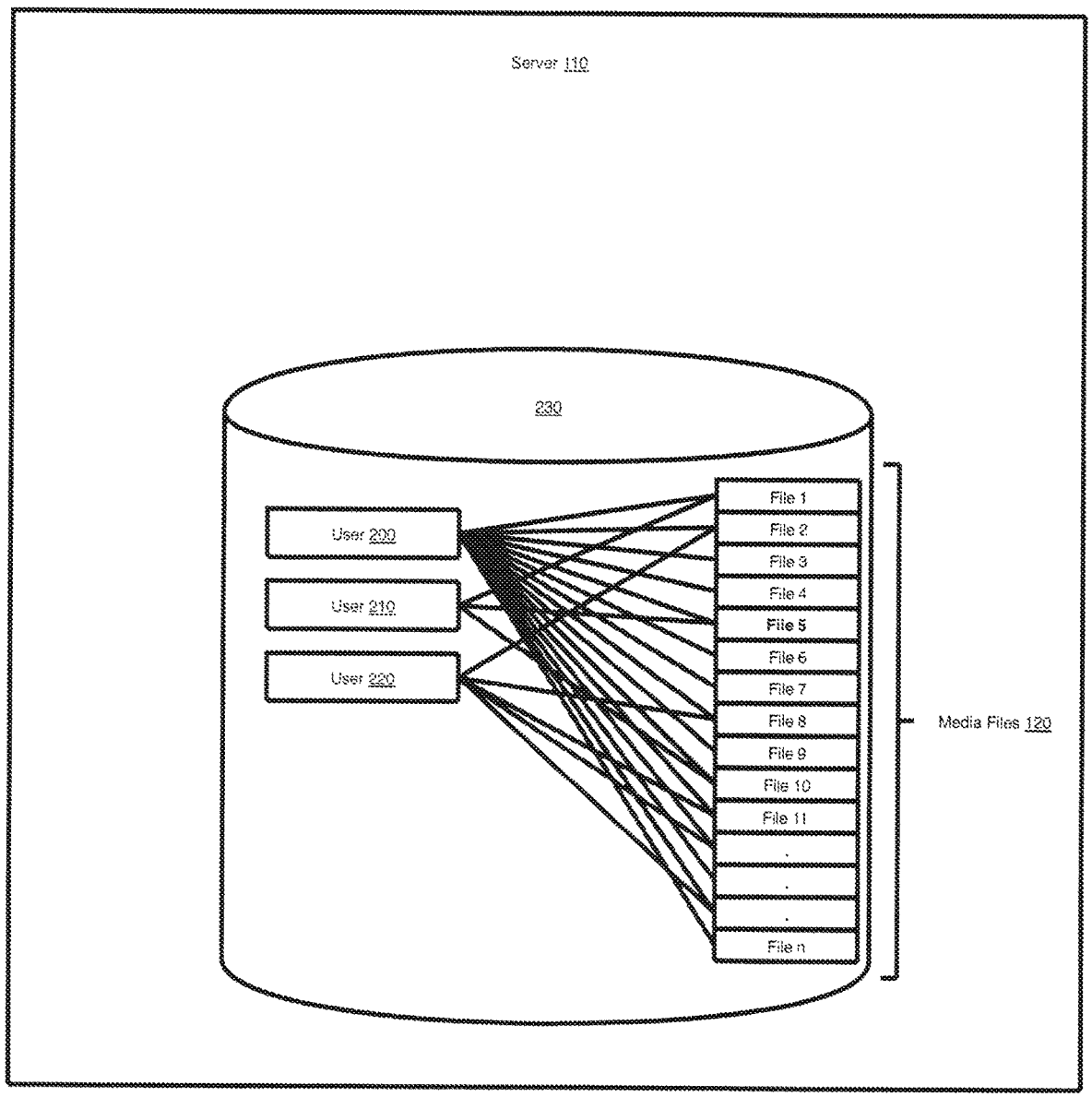
FIG. 2 shows a block diagram of an example of account relationships, according to implementations of this disclosure.

A system according to implementations of this disclosure may control a particular user's access to media files based on the account type associated with the particular user and the relationship between the account type and various media files. FIG. 2 shows block diagram of an example of account relationships, according to implementations of this disclosure. Server 110 can include organized data storage for storing media files 120, such as a file system or database 230. The set of media files 120 may include files 1, 2, 3, . . . n which can be any type of media content suitable for the purpose of this disclosure. For example, media files 120 can include audio or video tracks to accompany performances or segments of performances, coaching instructions, practice files such as practice videos uploaded from students, training files such as model videos uploaded by coaches, and/or analysis files that can include data comparing practice videos to training videos.

Users 200, 210, and 220 can be different types of users of the systems discussed herein. For example, user 200 may be a coach having a coach account and users 210 and 220 may be students having student accounts. Connections in FIG. 2 between users 200, 210, and 220 and media files 120 can indicate access to the respective media files by the respective user. The coach account may be linked to each of files 1, 2, 3, . . . n of the set of media files 120 because the media files 120 may be the set of audio tracks the coach uses to accompany the performance routines for his students. Student user 210 and student user 220 may be at different student levels such that they have different performance routines that they are learning. Accordingly, user 210 may be linked and have access to media file 1 whereas user 220 may be linked and have access to media file 2 and not media file 1.

Accounts, media files, and/or other data having a relationship to a user account can be stored with identifiers. Identifiers can be used to locate, link, create or deny access to, or otherwise maintain relationships among accounts, media files, and other data, according to implementations of this disclosure. For example, an identifier can include a user name, email address, membership number, device identifier, biometric data of a user, location data, or any other data suitable to identify something and that is suitable for the purposes of this disclosure. An entity such as a user, identifier, account, media file, and/or other entity can be directly or indirectly associated or linked with another entity. For example, a user may be associated or linked to an identifier directly if the user has been assigned that identifier. A user may be associated or linked to a media file indirectly if an identifier associated with the user is also associated with the media file, such as by being included in a list of identifiers assigned to the media file. For example, server 110 may store a list of identifiers associated with each media file 1, 2, 3, . . . n of media files 120 along with an identifier of user 200. As a result, when user 200 accesses an interface of the system, the interface may indicate each of media files 120 as associated with and accessible by user 200. As another example, server 110 may store a list of identifiers associated with media files 1, 5, and 10 of media files 120 along with an identifier of user 210. As a result, when user 210 accesses an interface of the system, the interface may indicate that only media files 1, 5, and 10 of media files 120 are associated with and accessible by user 210.

Users may have permissions to generate accounts for other users and configure permissions for media file access and other functionality of such other users, according to implementations of this disclosure. For example, a student, such as an ice skating student, may possess a computing device 150. The student's computing device 150 may connect to a wireless network located at public event premise 100, such as an ice rink, and provide one or more student identifiers associated with the computing device 150 and the student to server 110, such as the student's username and device identifier. Server 110 may detect the one or more identifiers associated with the student and provide a request to a computing device associated with a coach account, such as computing device 160, to approve or disapprove the generation of an account for the student. The coach's computing device 160 may provide an instruction to the server 110 to generate a student account associated with the student identifiers. Server 110 can receive the coach's instruction and in response, generate by a processor of the server 110, a student account associated with the student identifiers.

The coach may configure the permissions for the student's account, including which media files the student can access. For example, the coach may access an interface provided by an application on computing device 160 that displays indicators of media files associated with the coach's account, such as media files 120. The coach may, via the interface, select a particular set of media files of media files 120, such as media files 1, 5, and 10, and provide an instruction to server 110 that identifies the selected set of media files and directs the server 110 to associate the selected set of media files with the student's account. Server 110 may receive the instruction from the coach's computing device 160 and, in response, execute the instruction to associate the selected set of media files with the student's identifiers. The coach may generate multiple student accounts in a similar manner. For example a coach may be user 200. The coach can, via a coach account, generate additional student accounts, such as student accounts associated with users 210 and 220, and associate them with identifiers associated with different computing devices. Each respective student account can be associated with a respective identifier, which can be associated with a respective set of media files. Each respective set of media files can include fewer media files than the total number of media files associated with a coach account, such as media files 120. The total set of media files 120 can include, for example, a set of media files the coach uses for performance routines for the coach's different students and one or more subsets of media files 120 accessible by each of the coach's students.

Figure 3:
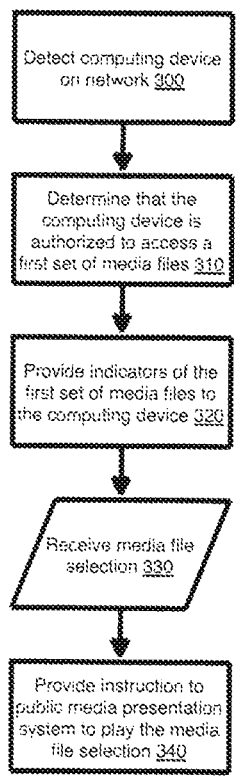
FIG. 3 shows a flow diagram of an example procedure for student access to a public media system, according to implementations of this disclosure.

Once the system generates a student account for a student, the student can access the interface of the system to play media files via a public media system. For example, FIG. 3 shows a flow diagram of an example procedure for student access to a public media system, according to implementations of this disclosure. A student's computing device, such as computing device 150, can connect to server 110 over network 140. The student's computing device 150 can provide an identifier associated with the student's account to server 110. At 300, the server 110 can detect the student's device 150 and, at 310, can determine the student's device 150 is authorized to access an interface of the system and/or a set of one or more media files of media files 120. For example, a processor of server 110 can compare the received identifier to a list of identifiers associated with media files 120 and/or computing device 150. The server 110 may determine that the received student identifier is the same as a particular identifier associated with a set of one or more media files of media files 120. Based on the comparison, the server 110 can determine that the student account associated with student device 150 is authorized to access an interface of the system and/or the set of one or more media files of the system.

In response to the determination that the student's device 150 is authorized to access the interface and/or the set of media files, at 320 server 110 can provide one or more indicators of the set of media files to the student's device 150 for presentation on the first computing device. The student's device 150 can execute the received instruction and present the one or more indicators of the set of media files. For example, the student's device 150 can display an application interface showing one or more graphical or textual representations of the set of media files. The student can select a media file of the set of presented indicators of media files, and at 330 the student device 150 can provide an instruction to server 110 to play the selected media file. At 340, in response to receipt from the student's computing device 150 of the selection of the media file, the server 110 can provide an instruction to the public media system 130 to play the selected media file. The public media system 130 can play the selected media file, which may, for example, accompany a student's training or performance routine at public event premises 100.

Systems as discussed herein can discern among authorized and unauthorized devices attempting to connect to server 110, according to implementations of this disclosure. For example, a first computing device can be connected to the system, and server 110 can determine that a second computing device remote from the system and distinct from the first computing device is authorized to access the interface of the system based on a second identifier associated with the second computing device. The server 110 can connect the second computing device to the system while the first computing device is connected to the system based on the determination that the second computing devices is authorized to access the media interface of the system and/or one or more media files of the system.

The sever 110 may detect a third computing device distinct from the first computing device and the second computing device on network 150. Server 110 may receive a third identifier associated with the third computing device and determine the third computing device is not authorized to access the media interface of the system and/or one or more media files of the system based on a third identifier associated with the third computing device. For example, the server 110 may determine that the third identifier is not included in a list of one or more identifiers associated with a media file of media files 120 or is not included in a list of identifiers authorized to access the interface of the system. The server can prevent the third computing device from connecting to the system based on the determination that the third computing device is not authorized to access the media interface.

Figure 4:
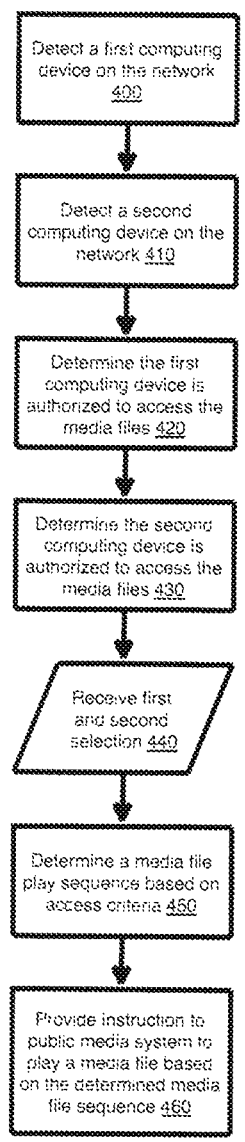
FIG. 4 shows a flow diagram of an example procedure for determining a play sequence for multiple connected accounts, according to implementations of this disclosure.

The system can determine a sequence to play media files when multiple authorized accounts are connected to a server of the system. For example, FIG. 4 shows an example procedure for determining a play sequence for multiple connected accounts, according to implementations of this disclosure. At 400 the server 110 of the system can detect a first computing device 150 on the network 140, and at 410 the server 110 can detect a second computing device 160 on the network 140. The server 110 can determine that the first computing device 150 is authorized to access a first set of media files based on a first identifier associated with the first computing device 150 at 420. At 430 the server 110 can determine the second computing device 160 is authorized to access a second set of media files of media files 120 based on a second identifier associated with the second computing device 160. At 440, the server 110 can receive a first selection of a media file from the first computing device 150 and a second selection of a media file from the second computing device 160.

The system can determine which media file to play based on access criteria associated with each of a first account associated with the first computing device 150 and a second account associated with the second computing device 160. Access criteria can include, for example, a first in time condition, account type ranking condition, a time window condition, and/or a media file type condition. A first in time condition can include, for example, a condition that specifies that the first computing device to request a media file has priority over a later requesting computing device. An account type ranking condition can include a condition that specifies that certain account types have precedence over others with respect to media file requests. For example, a coach account type or a manager account type can have precedence over a student account type; a student account associated with a coach account currently connected to the system can have precedence over non-associated student accounts; and/or an administrator account type can have precedence over all other account types. As another example, a coach account can assign the coach's priority privilege to a student account for a discrete amount of time, which may be, for example, based on the current practice session duration. In general, access criteria can include any type of criteria suitable for the purposes of this disclosure.

The server 110 of the system can determine at 450, a media file play sequence that includes the media file selection by the first account and the media file selection by the second account based on access criteria. For example, a media file may be playing on public media system 130 when server 110 receives the selection by the first and second accounts. System server 110 may have access criteria that includes an account type condition that prioritizes coach account types over student account types. If the first account is a student account type and the second account is a coach account type, server 110 may determine a media file play sequence in accordance with the access criteria that specifies that the selection by the second account will play before the selection by the first account, given that the second account is a coach account. In another example, the server 110 may have access criteria that includes a time window condition, which specifies a time window for the first account that covers a time span 15-45 minutes into the future and a time window for the second account that covers a time span 45-75 minutes into the future. In such an example, the play sequence could include playing the selection by the first account 15 minutes later and playing the selection by the second account 45 minutes later. In such an example, the system may determine that neither the selection by the first account nor the second account would play until the respective time windows opened, and other users would be permitted to request songs in the interim, in accordance with the access criteria. As another example, access criteria may include a time span within which any account may play a media file but grants one or more specific accounts priority to override selections by other accounts.

At 460, system server 110 can provide instruction to public media system 130 to play a media file based on the determined media file play sequence.

In general any set of access criteria suitable for the purposes of this disclosure may be combined to determine a media file play sequence. An account, such as an administrator account, may have permissions suitable to configure any types and combinations of access criteria, according to implementations of this disclosure.

Remote Premises and Media File Updates

Figure 5:
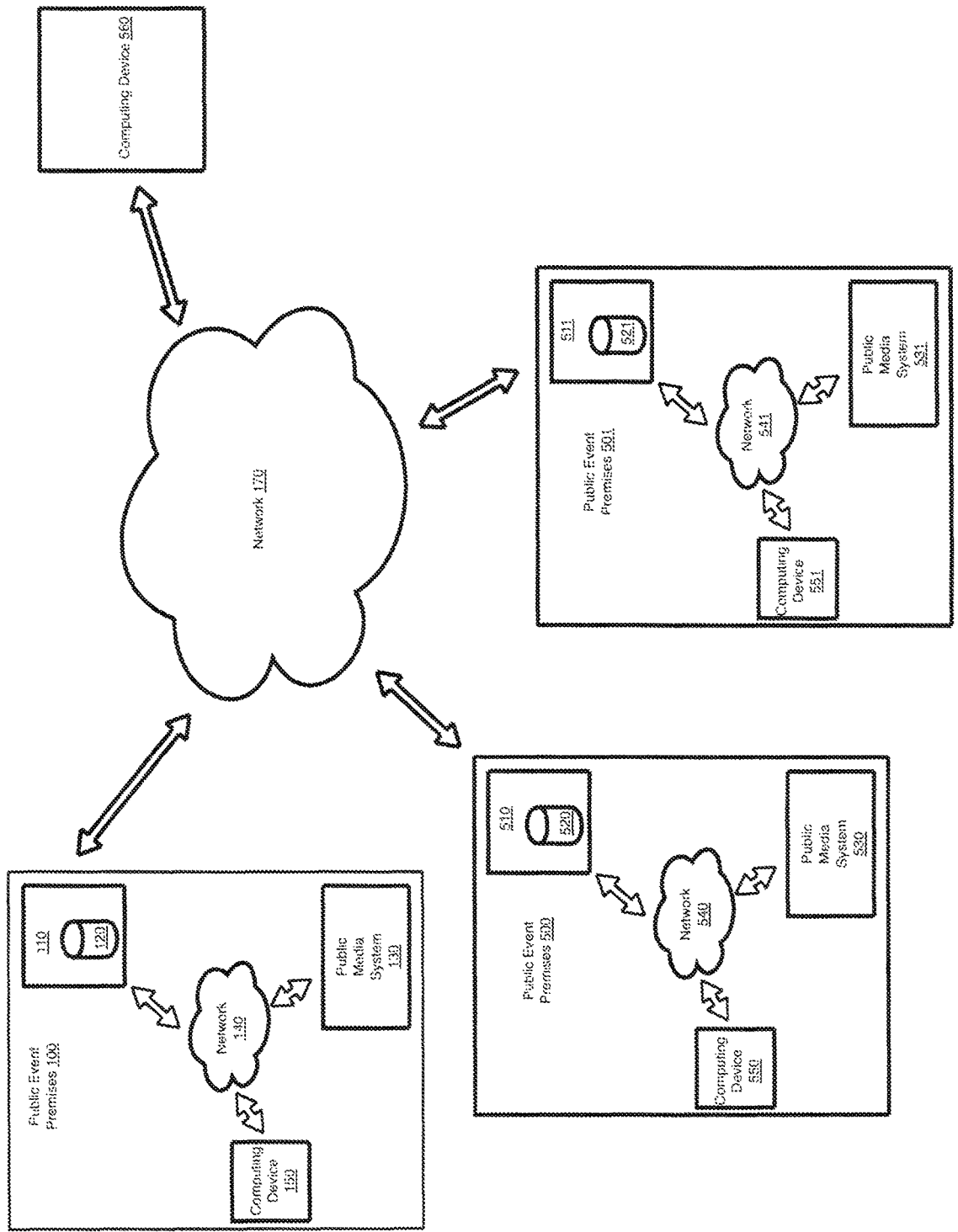
FIG. 5 shows a system diagram of an example system incorporating components at multiple remote public event premises, according to implementations of this disclosure.

In some circumstances, a coach may be responsible for training students in multiple remote locations. For example, students could be located in geographically distant locations, such that in-person training is not practical. In such circumstances, one or more instances of implementations of this disclosure may execute on a server in communication with a public media system located at each distant location. For example, FIG. 5 shows a system diagram of an example system incorporating components at multiple remote public event premises, according to implementations of this disclosure. Server 110, media files 120, public media system 130, network 140, and computing device 150 are shown at public event premises 100 as depicted in FIG. 1. Computing device 150 may be associated with a student of a coach who is associated with computing device 560. Server 110 may connect to the coach's computing device 560 over network 170. In addition to public event premises 100, there may also be, for example, public event premises 500 and public event premises 501, which may be located remote from public event premises 100 and/or each other.

Instances of implementations of this disclosure may execute on server 510 at public event premises 500 and server 511 at public event premises 501. For example, server 510 may store media files 520, which may include replicated versions of media files 120, and server 511 may store media files 521, which may include replicated versions of media files 120. Computing devices 550 and 551 may each be associated with different students having different access permissions. For example, the student associated with computing device 550 may be at a lower training level than the student associated with computing device 551. As a result, student computing device 551 may be able to access a set of media files of media files 521 that accompany more advanced routines than the media files accessible to the student of computing device 550 from media files 520. Each student may be able to select the media file(s) appropriate to her training level and provide instructions over the respective networks 540 and 541 to public media systems 530 and 531 to play the selected media files.

Figure 6:
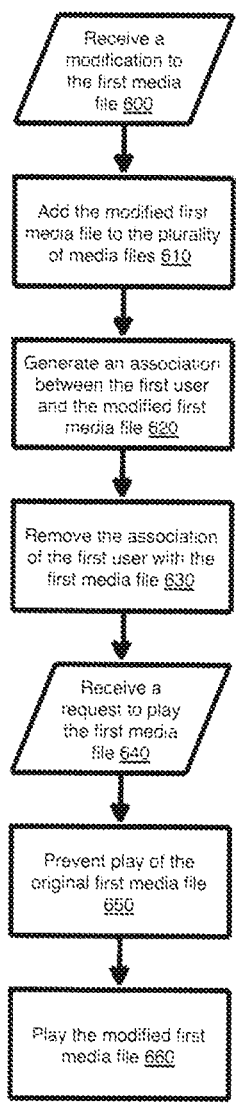
FIG. 6 shows a flow diagram for an example procedure for updating a media file, according to implementations of this disclosure.

It can be beneficial for a coach to be able to modify and update the media files available to her students to ensure her students are training to the correct accompanying media. For example, a coach may coach students who train over relatively long periods of time separate from in-person training with the coach. The coach may need to update the routine for the students during a period when the students are training independently. Implementations of this disclosure can allow for the coach to update the media files available to each student so that they can begin training to the new accompanying media file before the coach's next in-person meeting with the students. FIG. 6 shows a flow diagram for an example procedure for updating a media file, according to implementations of this disclosure.

A student's computing device, such as computing device 550 as shown in FIG. 5, can be associated with a first identifier and with an account, such as a student account. The student may practice her routines to a media file at a public event premises remote from the location of the student's teacher, such as public event premises 500. The coach can modify the first media file and upload the modified media file to a server in communication to the coach's computing device, such as any of the servers 110, 510, or 511 to which the coach's computing device can connect. In some implementations the coach may need to be at or near the public event premises that houses the server to which the coach connects. In some implementations the coach may connect to the server via a remote network connection, such as over network 170.

As shown in FIG. 6, at 600 a server, such as server 510, can receive the modified media file uploaded by the coach's computing device 560 and an instruction to update, based on the modified media file, the media files stored therein, such as media files 520. Server 510 can receive the modified media file and the instruction directly or indirectly. For example, server 510 can receive the modified media file and the instruction over a direct connection from the coach's computing device 560. As another example, server 510 can receive the modified media file and instruction indirectly from another server as a replicated version, such as from server 110 or server 511 to which the modified media file was initially uploaded from the coach's computing device 560.

Server 510 can update the media files 520, by performing operations to add the modified media file to the set of media files associated with the student's account. For example, server 510 can store the modified media file with media files 520 at 610 and generate an association between the modified media file and the student account at 620 by including an account identifier associated with the student to a list of identifiers associated with the modified media file. The server 510 can further update the media files 520 by performing operations to remove the unmodified version of the media file from the set of media files associated with the student's account at 630. For example, the unmodified version of the media file may remain in media files 520, but may no longer be associated with an account identifier associated with the student account. At 640, the server 510 may receive an instruction from the student's computing device 550 to play the media file. The server 510 can prevent the playing of the unmodified media file at 650 by, for example, having disassociated the student's account from the unmodified media file. At 660, server 510 can instead provide an instruction to public media system 530 to play the modified media file.

In the example procedure discussed in the preceding paragraph, a coach or other adequately permissioned user can ensure that students are training to the most up-to-date versions of the media files that are intended to accompany their routines. In a related manner, an adequately permissioned user can more generally establish which media files to which various users may have access. For example, a user, such as a coach having a coach account may be associated with a computing device, such as computing device 160. Server 110 can provide instructions to computing device 160 to display on an application interface of computing device 160, all currently uploaded media files 120 and/or other media files stored on computing device 110 or otherwise in communication with computing device 110. The user can select one or more of the media files presented. If the media file is not uploaded, the user can select an option to upload the media file to server 110. One or more accounts associated with the user's account may be presented in the interface. The user can select via the interface one or more accounts to be associated with the selected media file and/or associated or disassociated with other media files. In response, computing device 160 can send an instruction to server 110 to associate or disassociate the selected media file or other media files and the server 110 can execute the instructions to perform the selected operation. Other functionality may also be provided for adequately permissioned users according to implementations of this disclosure, such as addition or deletion on media files from servers or other computing devices.

Figure 7:
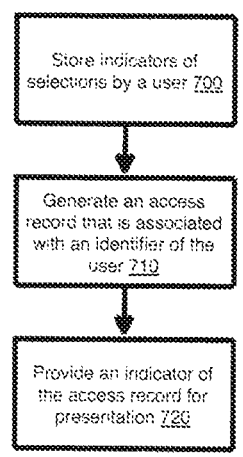
FIG. 7 shows a flow diagram of an example procedure for monitoring user access history, according to implementations of this disclosure.

In some circumstances, a user may wish to track the behavior of other users. For example, a user having a coach account may wish to track the media file access history of the coach's student users. This may particularly be the case where students are located remotely from the coach and the coach desires to continue to track the students' progress. Accordingly, FIG. 7 shows a flow diagram of an example procedure for monitoring user access history, according to implementations of this disclosure. At 700 server 110 can store indicators of selections by a user, such as a student user associated with computing device 150, of a media file from media files 120. At 710, the server 110 can generate an access file that is associated with an identifier of the user. The access file can include stored indicators of selections by the user of a media file from media files 120. For example, the access file can store an identifier of computing device 150 used to select the media files or an account name of the user. A coach can review the access file by selecting an access file option associated with the user on an application interface provided to computing device 160 associated with the coach. In response to the coach's selection, computing device 160 can send instructions to server 110 to request the access file of the user. In response to receipt of the request, server 110 can provide an indicator of data contained in the access file for presentation on the coach's computing device 160 at 720.

In general, a user, such as a coach or manager, may modify the characteristics of media files, such as audio tracks. For example, a user may upload a media file to server 110 and associate the media file with the user's account. The uploaded media file may be an audio track, and the user can provide instructions to server 110 to process the audio track. For example, the server may receive an audio track and perform operations to normalize the volume or gain of the audio track, increase or decrease the beat rate, or perform other manipulations of the audio signal in accordance with parameters provided by the user.

Video Instruction and Analysis

Figure 8:
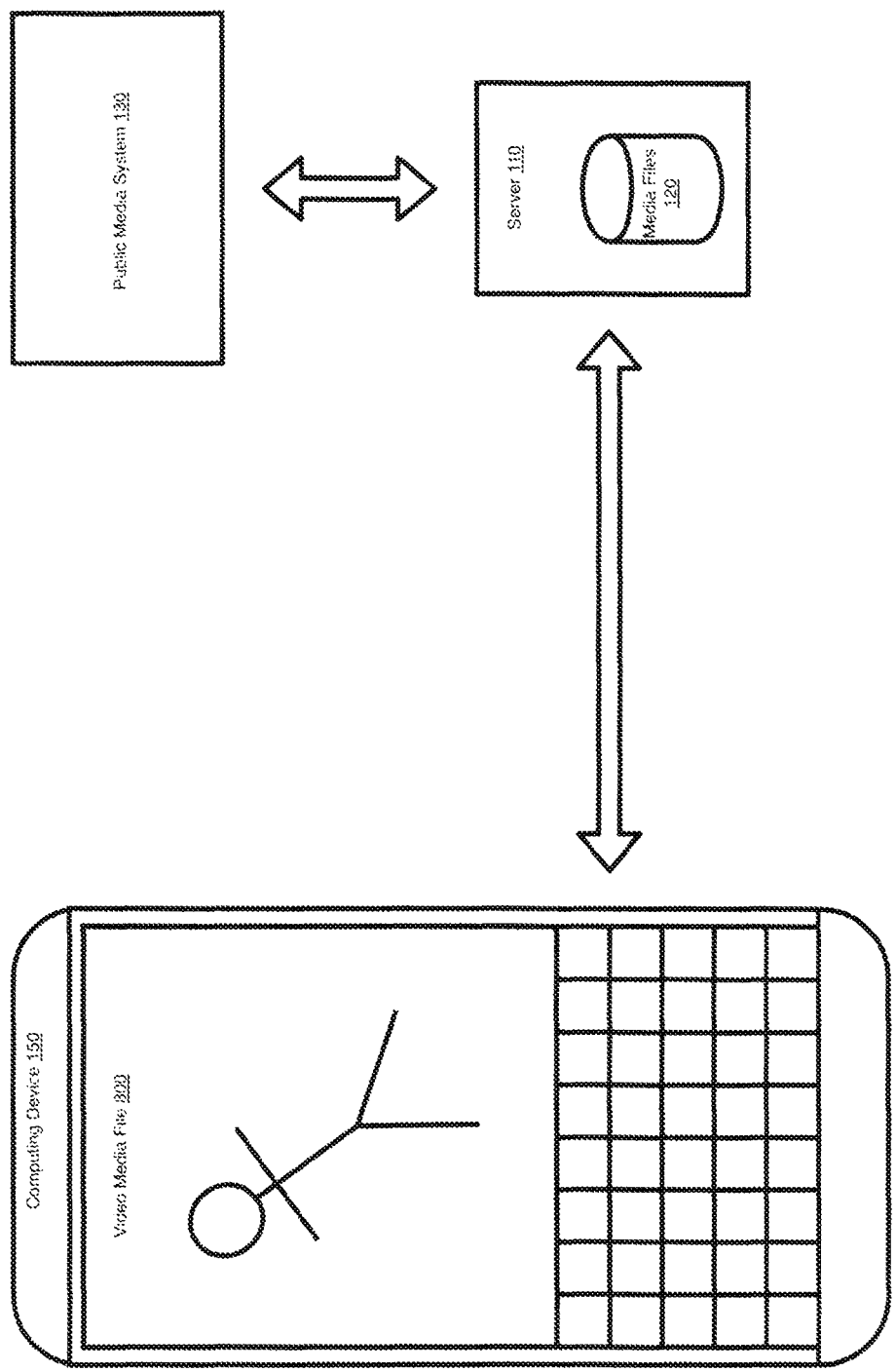
FIG. 8 shows a system diagram of an example system for student video instruction and analysis, according to implementations of this disclosure.

Implementations of this disclosure can provide for users to make video media files available to other users for uses such as demonstration of model training routines, analysis of student performance, and validation of student progress. FIG. 8 shows a system diagram of an example system for student video instruction and analysis, according to implementations of this disclosure. A user may possess and be associated with computing device 150. Computing device 150 may include a display for presenting content such as video media file 800. Computing device 150 may receive video media files from or upload video media files to server 110, and server 110 may store video media files among media files 120. In some implementations, server 110 may provide video media files to public media system 130 for presentation at a public event premises.

Video media files may be sequenced to audio media files that function as auditory cues for the execution of various elements of a performance routine. For example, the timing of a high difficulty jump in an ice skating routine may be synchronized to the peak of a crescendo of the accompanying audio track. It can be beneficial for a coach to provide video tracks of model performances of the routine that the coach is teaching to her students.

Figure 9:
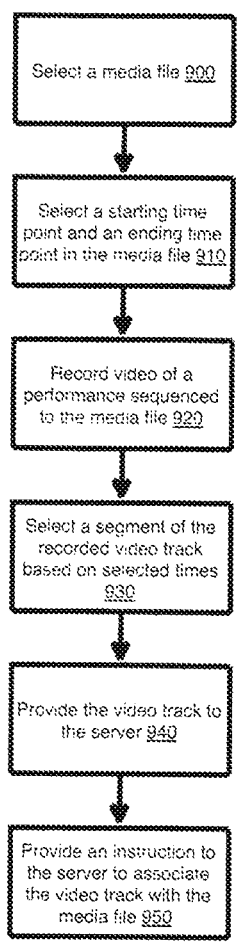
FIG. 9 shows a flow diagram of an example procedure for generating video media files, according to implementations of this disclosure.

FIG. 9 shows a flow diagram of an example procedure for generating video media files, according to implementations of this disclosure. At 900 a user such as a coach may select a media file using the user's computing device 150. The media file may be an audio track having various time points. For example, the audio track may be intended to accompany a performance routine. The audio track may be intended to be synchronized with the routine such that certain elements of the routine are intended to occur temporally proximate to certain elements of the audio track. For example, an audio track may have elements such as the start at 0:00, a dramatic tempo change at 0:22, a first very loud dynamic change at 0:48, a change in melody at 1:12, a second very loud dynamic change at 1:19, and the end at 1:22. The performance routine may be, for example, an ice skating routine and have elements that correspond to the audio track's elements. For example, a first performance element may be a toe loop that occurs at 0:22, the second performance element may be a first axel jump at 0:48, the third performance element may be a spin at 1:12, and the fourth performance element may be a second axel jump at 1:22. Generally, a user may select any set of performance routine elements and accompanying audio track elements that are suitable for the purposes of this disclosure.

The user may select one or more time points of the audio track at 910. In some implementations the user may generate a video media file that corresponds to the entire audio track. In other implementations the user may generate a video media file that corresponds to a portion of the performance routine. For example, the first axel jump at 0:48 may be the most difficult element in the routine and accordingly require the most instruction. As a result a user, such as a coach, may select a time point several seconds before and after the corresponding 0:48 very loud dynamic change. For example, the coach may select a time period having a first time point at 0:40 and a second time point at 0:55. In general, a user may select any set of one or more time points, which are suitable for the purposes of this disclosure.

The user may record a video track of a model performance of the routine that covers the selected time segment at 920. For example, the coach may have an older more experienced student perform the relevant portion of the routine accompanied by the audio track, and the coach may capture a video of the model performance with her computing device 160. In some implementations the system may include or access an existing video of the model performance. At 930, the coach can select a segment of the video track based on the selected time points. For example, the coach can edit the video track using an interface displayed on computing device 160 to begin at 0:45 and end at 0:55. At 940, the coach's computing device 160 can provide the edited video track to server 110. The coach may want to make the video track available to the student. Thus, computing device 160 can present an interface that presents an option for the coach to associate a video media file including the video track with student account. At 950, computing device 160 can send an instruction to server 110 to associate video media file with the student's account.

Figure 10:
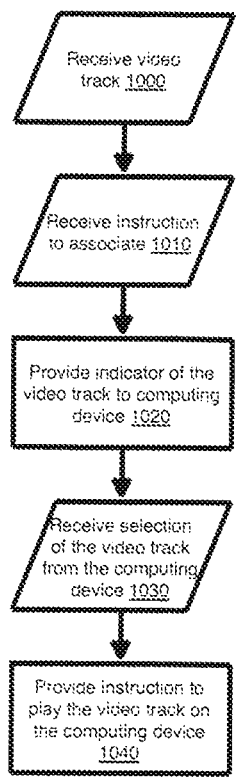
FIG. 10 shows a flow diagram of an example procedure for providing a video media file to a user, according to implementations of this disclosure.

Video media files can be associated with user accounts just as other media files can be associated with user accounts. Users may access video media files and other media files, such as accompanying audio tracks, on the user's own computing device for review and instruction. For example, FIG. 10 shows a flow diagram of an example procedure for providing a video media file to a user, according to implementations of this disclosure. Continuing the example from FIG. 9, at 1000 server 110 can receive a video media file that includes the video track of the model performance. The video media file may be sequenced to the selected time segment of the audio track beginning at the first time point of 0:45. Server 110 can receive the instruction from the coach's computing device to associate the received video media file with student's account. The server 110 can execute the instruction and perform operations to associate the video media file with the student's account.

Server 110 may provide an indicator of the video media file to the student's computing device 150 at 1020, and the student may interact with the interface of the student's computing device 150 and determine that the video media file is accessible to the student. For example, server 110 may provide data to computing device 150 to support an application executing on computing device 150 that displays an interface with a visual indicator of the video media file. The student can select an option on the interface that provides a request to server 110 to play the video media file. Server 110 can receive this request at 1030. In response to receipt of this request, the server 110 can provide the video media file to the student's computing device 150 along with an instruction to play the video media file on computing device 150 at 1040. For example, an application interface executing on computing device 150 can receive the video media file data and the instruction to play the video media file and can render the video media file for presentation on a display of computing device 150.

Figure 11:
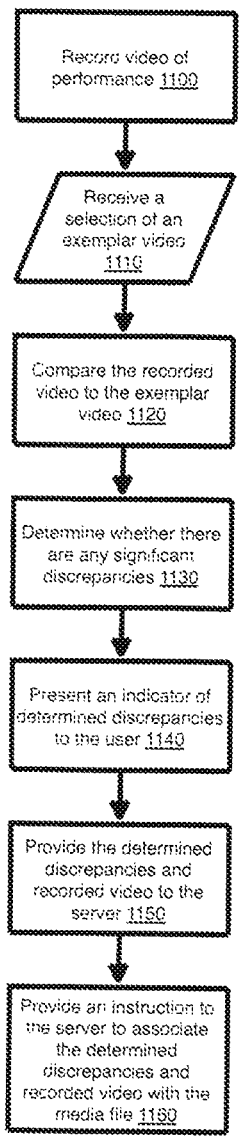
FIG. 11 shows a flow diagram of an example procedure for recording and analyzing student performance, according to implementations of this disclosure.

Users such as coaches may wish to directly monitor and receive analytic data regarding student training progress. FIG. 11 shows a flow diagram of an example procedure for recording and analyzing student performance, according to implementations of this disclosure. A student can record a video track of the student's practice performance of some or all of a routine at 1100. For example, the student can set up a tripod or have a parent or friend record a video track of the student performing the routine on the student's computing device 150. The student can upload the student's practice video track to server 110 from the student's computing device 150 and associate the practice video track with the student's account maintained on server 110. As another example, a student can repeatedly record video tracks of the student's practice performances over time. These video tracks can be uploaded to server 110 and analyzed, such as by using motion analysis techniques discussed below, to determine improvement of the student over time. For example, a statistically significant number of video tracks may be uploaded and analyzed to determine one or more indicators of student progress. The progress indicators may be stored in an analysis file as discussed below and associated with the student's account.

The student's coach may have uploaded an example video media file that includes a model performance covering the elements of the student's practice video track and may have associated the model performance video track with the student's account. The student can select the model video track, for example, via an interface on an application executing on the student's computing device 150. At 1110, server 110 can receive an indicator of the student's selection and provide access to the model video track to the student's account for analytical operations. The model video media file may include specifications indicating the camera position, configuration, and related details sufficient to inform the viewer as to how the model video was captured. The specifications may be used by a user when capturing videos to be compared to the model video.

Operations executing on the student's computing device 150 and/or server 110 can compare the student's practice video track to the model video track at 1120. At 1130, server 110 and/or computing device 150 can perform motion analysis operations or other machine learning-based operations to determine whether there are significant differences between the model performance and the practice video. Any combination of hardware and/or software may be employed to perform motion analysis operations suitable for the purposes of this disclosure. For example, computing device 150 and/or server 110 can perform motion analysis operations such as edge detection or gait analysis to extract features from the practice video track and/or the model video track such as position, orientation, color, shape, and texture. Operations can be performed to measure parameters of the video tracks, such as distance, velocity, acceleration, and deformation angles as functions of time. Features and parameters of the practice video track can be compared to the model video track to determine differences. For example, if the position of the student's skate in the practice video track is determined to differ from the position of the performer's skate in the model video track by more than a threshold value, then the server 110 and/or computing device 150 can determine that a significant difference exists between the practice video track and the model video track. In some implementations, model video tracks may be pre-processed, such that, for example, templates composed of sequences of shape patterns may be abstracted from the model video and serve as a basis for comparison to practice videos.

Computing device 150 and/or server 110 can generate an analysis file that includes model video segments, practice video segments, analysis data, and other related data, according to implementations of this disclosure. The analysis file may be associated with the student, such as by associating the analysis file with an identifier associated with the student account. Analysis files may be stored on computing device 150 and/or server 110, such as within media files 120.

An interface provided by an application executing on the student's computing device 150 can present indicators of the performance differences stored in the analysis file at 1140. For example, the application may excerpt images or video segments from the practice video track for display adjacent to corresponding images or video segments from the model video track. For instance, continuing the example discussed in FIG. 9, the student may have been late in executing the axel jump that is intended to be performed at 0:48. The practice video track may show the student off the ice at 0:51, whereas the model video track may show the model performer off the ice at 0:48. The application executing on the student's computing device 150 can display an image at the 0:48 point from the student's practice video track showing the student on the ice adjacent to an image from the model video at the 0:48 point showing the model performer off the ice and in performance of the axel jump. As another example, the application can show a video segment from the practice video track and model video track. For example, a 0:47-0:50 segment from each video track may be displayed adjacent to each other. The segment from the model video track may depict the model performer performing the full axel jump, whereas the student practice video may show the student on the ice for the full segment. More generally, any set of indicators of differences, such as time markers, video highlighting, textual or audio markers, and so forth, which are suitable for the purposes of this disclosure, may be presented to a user.

The student can review the analysis file to determine whether she desires to associate the analysis file with the student's account and store the analysis file with media files 120. In some implementations, once an analysis file is generated it is automatically stored in media files 120 and associated with the student account and/or coach's account. At 1150, if the analysis file is not already uploaded to server 110, then the student's computing device 150 may upload the analysis file to media files 120 on server 110. The student may associate the analysis file with the student's account, the coach's account, and/or other users at 1160. As a result other users of the system disclosed here may access and review data included in the analysis file.

A user such as a coach can review analysis files to evaluate a student's progress, according to implementations of this disclosure. For example, a student account may be associated with a media file having a first segment and a second segment. The first segment may be a first audio track that corresponds to a first portion of a performance routine the student is practicing. The student may have access to the first segment, but may be prohibited from accessing the second segment by server 110, unless one or more conditions is satisfied. The student may provide an instruction to public media system 130 to play the first segment. The student may practice the first portion of the routine and have her practice performance recorded as a video track in a video media file. The student can upload an analysis file to server 110 containing the video media file of her practice performance. The server 110 can receive the analysis file and associate it with the coach's account. The server 110 can provide an indicator of the video media file to the coach's computing device 160. The coach can then select and view the video media file on computing device 160, and evaluate the student's performance.

If the coach determines the student has successfully performed the first portion of the routine, the coach can provide an indicator to server 110 that that the student has succeeded. This success indicator may satisfy a condition associated with the second segment of the media file. Upon satisfaction of this condition, the server 110 can make the second segment of the media file available to the student. As a result, the student may begin practicing the second portion of the routine. If the coach determines the student has not successfully performed the first portion of the routine, the coach can provide an indicator to server 110 that the student has not succeeded. The student may view this indicator and be informed that she needs more practice. Generally, any set of conditions suitable for the purposes of this disclosure may be employed for releasing or otherwise making media files or segments thereof accessible to users.

Systems disclosed herein can make new media files accessible to users based on analysis files, according to implementations of this disclosure. For example, similar to the previous example, a student account may be associated with a first media file having a first segment and a second segment. The first media file may be associated on server 110 with a model video media file. The first segment may be a first audio track that corresponds to a first portion of a performance routine the student is practicing. The student may have access to the first segment but may be prohibited from accessing the second segment by server 110, unless one or more conditions is satisfied.

The student may provide an instruction to public media system 130 to play the first segment. The student may practice the first portion of the routine and have her practice performance recorded as a video track in a video media file. The student's computing device 150 and/or server 110 can execute motion analysis operations on the video media file and the model video media file and generate an analysis file. The analysis file may indicate that there were no significant differences between the student performance and the model performance. The student may associate the analysis file with the student's account and the model video media file. The association of the analysis file having no indicators of significant differences with the model video media file and the student's account may satisfy a condition associated with the second segment. Upon satisfaction of this condition, the server 110 can make the second segment of the first media file available to the student, without manual review of any user. As a result the student may begin practicing the second portion of the routine. If the system determines the student has not successfully performed the first portion of the routine, server 110 and/or computing device 150 can provide an indicator to the student that she has not succeeded. The student may view this indicator and be informed that she needs more practice. Generally, any set of conditions suitable for the purposes of this disclosure may be employed for releasing or otherwise making media files or segments thereof accessible to users.

Other Components

Figure 12:
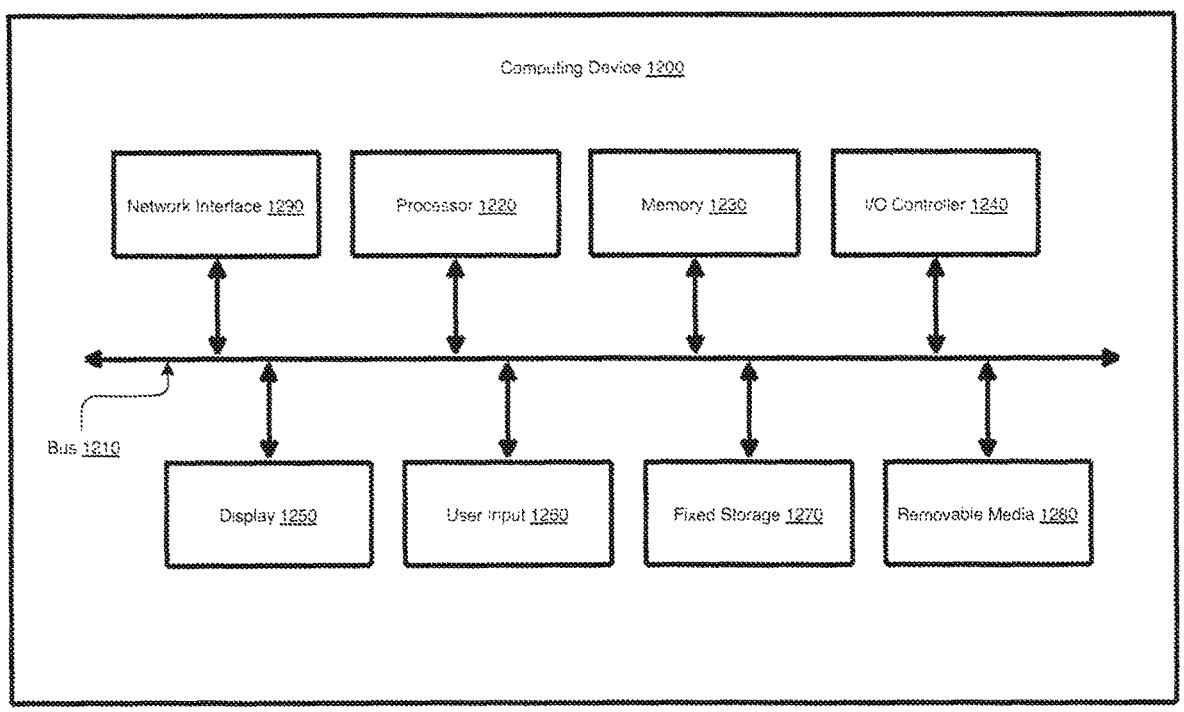
FIG. 12 shows an example computing device according to implementations of this disclosure.

Implementations of this disclosure can be implemented in and used with a variety of components and network architectures. FIG. 12 is an example computing device 1200 according to implementations of this disclosure. Computing devices, such as computing device 1200, can include computers, servers, mainframes, desktops, laptops, tablets, smart phones, wearable devices, and other data processing devices. Computing device 1200 can include a bus 1210 that interconnects major components of the computing device 1200. Major components can include: central processing unit ("CPU") 1220 (which can include a processor that includes circuitry for arithmetic logic units, control units, and/or processor registers); memory 1230 (which can include random-access memory ("RAM"), read-only memory, flash RAM, or other volatile or non-volatile memory components); input/output ("I/O") controller 1240;

user display 1250 (which can include a display screen via a display adapter); user input interface 1260 (which can include one or more controllers and associated user input devices such as a keyboard, mouse, touch screen, microphone, or camera, and can be closely coupled to the I/O controller 1240); fixed storage 1270 (which can include, a hard drive, flash storage, Fiber Channel device, storage area network device, advanced technology attachment ("ATA") device, serial ATA device, small computer system interface ("SCSI") device, serial attached SCSI device, or other non-volatile physical storage device); removable media component 1280 operative to receive and control an optical disk, flash drive, or other removable media, and network interface 1290.

Bus 1210 allows data communication between the CPU 1220 and the memory 1230, which can include ROM or flash memory (neither shown), and RAM, as previously noted. RAM is generally the main memory into which the operating system and application programs are loaded. The ROM or flash memory can contain, among other code, the basic input-output system which controls basic hardware operation such as the interaction with peripheral components. Applications resident with the computing device 1200 are generally stored on and accessed via a computer-readable medium, such as a fixed storage 1270 or removable media 1280.

Many other devices or components (not shown) can be connected to computing device 1200 in a similar manner (e.g., document scanners, digital cameras, biometric and other sensors, virtual reality devices, and other devices that interact with computing devices). Conversely, all of the components shown in FIG. 12 need not be present to practice implementations of this disclosure. The components of FIG. 12 can be interconnected in different ways from that shown. Code or instructions for operation of implementations of this disclosure may be non-transitory and can be stored in computer-readable storage media such as one or more of memory 1230, fixed storage 1270, and removable media 1280 that are local or integrated with computing device 1200 or located remote from computing device 1200.

Network interface 1290 may provide a direct connection to a remote server via a telephone link, the Internet via an internet service provider, or a direct connection to a remote server via a direct network link to the Internet via a point of presence or other network connection technique. The network interface 1290 may provide such connection using wireless techniques, including near field communication connections, Bluetooth connections, digital cellular telephone connections, cellular digital packet data connections, digital satellite data connections, or other communication techniques. For example, the network interface 1290 may allow computing device 1200 to communicate with other computing devices via one or more networks as shown in FIG. 12.

Figure 13:
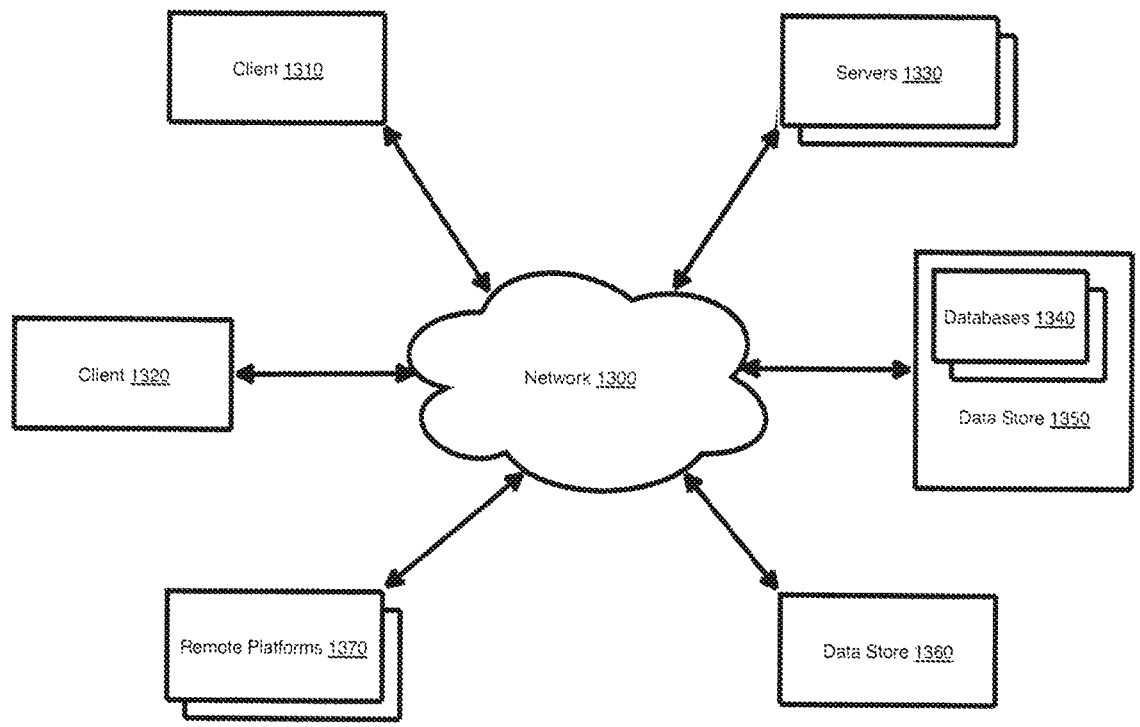
FIG. 13 shows an example network arrangement according to implementations of this disclosure.

FIG. 13 shows an example network arrangement according to implementations of this disclosure. One or more clients 1310, 1320, such as local computing devices, smart phones, tablet computing devices, wearable devices, or other client devices can connect to other devices via one or more networks 1300. Network 1300 can be wired or wireless and can be a personal-area network, local-area network, passive optical local area network, mesh network, campus area network, metropolitan area network, wide-area network, storage-area network, system-area network, enterprise private network, virtual private network, the Internet, or any other communication network or networks suitable for the purposes of this disclosure. Clients 1310, 1320 can communicate with one or more servers 1330 and databases 1340. Network devices and services can be directly accessible by clients 1310, 1320, or one or more other network components may provide intermediary access such as where one or more servers 1330 manage access by clients, 1310, 1320 to resources stored in one or more databases 1340. Database 1340 can be implemented on a data store 1350, whereas data store 1360 can store data in a non-database format. A data store can be any combination of hardware and software suitable for storing structured and/or unstructured data. Clients 1310, 1320 also may access one or more remote platforms 1370 or services provided by remote platforms 1370 such as infrastructure as a service, platform as a service, software as a service, and backend as a service. Remote platforms 1370 may include one or more servers and/or databases.

In general, various implementations of this disclosure can include computer-implemented procedures or processes and apparatuses for practicing those procedures or processes. Implementations of this disclosure can also be implemented in the form of a computer program product having program code or instructions encoded thereon. Program code or instructions can be stored in non-transitory, computer-readable media, such as floppy diskettes, optical disks, hard drives, universal serial bus drives, or any other machine readable storage medium. When the program code or instructions are loaded into and executed by a computing device, the computing device becomes an apparatus for practicing implementations of this disclosure. In addition, program code or instructions can be stored in a remote storage medium and transmitted over a transmission medium, such as electrical wiring, cabling, or fiber optics, or via electromagnetic radiation to a computing device, and when the program code or instructions are loaded into and executed by the computing device, the computing device becomes an apparatus for practicing implementations of this disclosure.

According to implementations of this disclosure, when program code or instructions are executed on one or more general-purpose processors (such as on one or more CPUs, microprocessors, or other general-purpose integrated circuits having one or more processing cores) segments of the program code or instructions can configure the one or more general-purpose processors to create specific logic circuits. In some implementations, program code or instructions stored on a computer-readable storage medium can be executed by a general-purpose processor, which can transform the general-purpose processor or a device containing the general-purpose processor into a special-purpose device configured to implement or carry out the computer code or instructions.

All or part of implementations of this disclosure can be embodied in hardware and/or firmware that include integrated circuits such as microprocessors, digital signal processors, microcontrollers, ASICs, FPGAs, graphics processing units, systems on a chip, three dimensional integrated circuits, programmable array logic, programmable logic arrays, field programmable logic arrays, electrically programmable logic devices, electrically erasable programmable logic devices, logic cell arrays, application specific standard products, or any other integrated circuitry suitable for the purposes of this disclosure.

The devices described herein may be part of a data processing system that includes one or more of a processor, memory, input/output circuitry, and peripheral devices. The data processing system can be used in a wide variety of applications, such as computer networking, data networking, instrumentation, video processing, digital signal processing, or any other application suitable for the purposes of this disclosure. The devices described herein can be used to perform a variety of different logic functions in conjunction with such data processing systems. For example, the devices disclosed herein can be configured as a processor or controller that works in cooperation with a processor of the data processing system. The device may also be used as an arbiter for arbitrating access to a shared resource in the data processing system. In another example, the device can be configured as an interface between a processor and one of the other components in the data processing system.

Although the operations described in this disclosure may be described in a specific order, other operations may be performed in between described operations. Operations described herein may also be adjusted so that they occur at different times or described operations may be distributed in a system which allows the occurrence of the processing operations at various intervals associated with the processing, as long as the processing of the overlay operations are performed in a desired way.

For the purposes of this disclosure, unless expressly stated otherwise: (a) the use of singular forms of terms include plural forms; (b) the use of the terms "including," "having," and similar terms are deemed to have the same meaning as "comprising" and thus should not be understood as limiting; (c) the term "set" or "subset" means a collection of one or more than one elements; (d) the term "plurality" means a collection of two or more elements; (e) the term "such as" means for example; (f) the term "and/or" means any combination or sub-combination of a set of stated possibilities, for example, "A, B, and/or C," means any of: "A," "B," "C," "AB," "AC," or "ABC;" and (g) headings, numbering, bullets, or other structuring of the text of this disclosure is not to be understood to limit or otherwise affect the meaning of the contents of this disclosure.

The foregoing disclosure, for purpose of explanation, has been described with reference to specific implementations. The illustrative discussions above are not intended to be exhaustive or to limit implementations of the disclosure to the precise forms disclosed. Many modifications and variations are possible in view of the teachings of this disclosure. The implementations were chosen and described in order to explain the principles of implementations of the disclosure and their practical applications, and to thereby enable others skilled in the art to utilize those implementations as well as various implementations with various modifications as may be suited to the particular use contemplated.

The invention claimed is:

1. A system, comprising:
    a processor in communication with a public event media system that is located within a public event premises; and
    a non-transitory, computer-readable medium in communication with the processor and storing instructions that, when executed by the processor, cause the processor to perform operations, comprising:
    determining, by the processor, that a first computing device remote from the system is authorized to access a first set of media files of a plurality of media files, wherein the access is based on a first identifier associated with the first computing device;
    in response to the determination that the first computing device is authorized to access the first set of media files, providing, by the processor, one or more indicators of the first set of media files to the first computing device for presentation on the first computing device;
    receiving an indication, by the processor, from said first computing device remote from the system, of a selection of a first media file to play for a user from the first set of media files;
    receiving a play request, by the processor, from a second computing device remote from the system;
    authenticating, by the processor, said user based on a second identifier input to said second computing device remote from the system; and
    in response to receipt by the processor from the of the play request from the authenticated user, providing, by the processor, a first instruction to the public event media system to play the first computing device selection of the first media file.

2. The system of claim 1, wherein the operations further comprise:
    prior to the determination that the first computing device is authorized to access the first set of media files, determining, by the processor, based on the first identifier that the first computing device is authorized to access a media interface that provides access to the plurality of media files;
    connecting, by the processor, the first computing device to the system based on the determination that the first computing device is authorized to access the media interface;
    determining, by the processor, that said second computing device remote from the system and distinct from the first computing device is authorized to access the media interface based on a second identifier associated with the second computing device;
    connecting, by the processor, the second computing device to the system while the first computing device is connected to the system based on the determination that the second computing devices is authorized to access the media interface;
    determining, by the processor, that a third computing device, distinct from the first computing device and the second computing device, is not authorized to access the media interface based on a third identifier associated with the third computing device; and
    preventing, by the processor, the third computing device from connecting to the system based on the determination that the third computing device is not authorized to access the media interface.

3. The system of claim 1, wherein the operations further comprise:
    determining, by the processor, that said second computing device remote from the system and distinct from the first computing device is authorized to access a second set of media files of the plurality of media files based on a second identifier associated with the second computing device;
    prior to the provision of the first instruction, receiving, by the processor from the second computing device, a selection by said second user of a second media file from the second set of media files; and
    determining, by the processor, a media file play sequence comprising the first media file and the second media file based on an access criteria;
    wherein the provision of the first instruction is based on the determination of the media file play sequence.

4. The system of claim 1, wherein:
    the first identifier is associated with a coach account;
    the second identifier is associated with a respective student account;

the second identifier is associated with a respective second set of media files; and the second set of media files comprises fewer media files than the first set of media files.

5. The system of claim 1, wherein:

the first identifier is associated with a student account;

the operations further comprise, before proving the first instruction to play the first media file:

receiving, by the processor from said second computing device remote from the system and associated with said second identifier associated with a coach account, a modified first media file and an instruction to update the first set of media files based on the modified first media file, and updating, by the processor, the first set of media files, comprising removing the first media file from the first set of media files and adding the modified first media file to the first set of media files; and the first instruction to play the first media file comprises an instruction to play the modified first media file.

6. The system of claim 1, wherein:

the first identifier is associated with a student account; and the operations further comprise, before proving the first instruction to play the first media file:

receiving, by the processor from said second computing device remote from the system and associated with said second identifier associated with a coach account, a second instruction to generate a student account associated with the first identifier, in response to the receipt of the second instruction, generating, by the processor, the student account associated with the first identifier, receiving, by the processor from the second computing device, a selection by a second user of the first set of media files, receiving, by the processor from the second computing device, a third instruction to associate the first set of media files with the first identifier, in response to the receipt of the third instruction, associating, by the processor, the first identifier with the first set of media files.

7. The system of claim 1, wherein:

the first media file comprises an audio track;

the first set of media files comprises a second media file comprising a video track; and the operations further comprise:

receiving, by the processor from the first computing device, a selection by said first user of a second media file, and in response to the receipt of the selection by the first user of the second media file, providing, by the processor, a second instruction to the first computing device, to play the second media file.

8. The system of claim 1, wherein:

the first identifier is associated with a student account;

the first media file comprises an audio track comprising a time point;

the operations further comprise:

receiving, by the processor from said second computing device remote from the system and associated with said second identifier associated with a coach account, a video track depicting a visual performance sequenced to a segment of the audio track beginning at the first time point, receiving, by the processor from the second computing device, an instruction to associate the first media file with the video track, and in response to receipt from the first computing device of a selection by the first user of the video track, providing, by the processor, an instruction to the first computing device to play the video track.

9. The system of claim 1, wherein the operations further comprise:

storing, by the processor, indicators of selections by the first user of a media file from the first set of media files;

generating, by the processor, an access record that is associated with the first identifier and comprises the stored indicators of selections by the first user of a media file from the first set of media files;

in response to a request from said second computing device remote from the system and associated with said second identifier associated with a coach account, providing, by the processor, an indicator of the access record for presentation on the second computing device.

10. The system of claim 1, wherein:

the first set of media files comprise a second media file comprising a first video track; and the operations further comprise:

receiving, by the processor from the first computing device, a second video track associated with the first media file, comparing, by the processor, the second video track to the first video track, determining, by the processor, differences between the first video track and the second video track, and generating, by the processor, an analysis file that is associated with the first identifier and comprises the determined differences between the first video track and the second video track.

11. The system of claim 1, wherein:

the first media file comprises an audio track comprising a first segment and a second segment that is accessible to the first computing device on condition of completion of the first segment;

the first instruction comprises an instruction to play the first segment; and the operations further comprise:

receiving, by the processor from the first computing device, a first video track associated with the first media file, providing, by the processor to said second computing device that is distinct from the first computing device and associated with a second identifier, an indicator of the first video track, receiving, by the processor from the second computing device, an indicator of completion of the first segment, in response to the receipt of the indicator of completion of the first segment, providing, by the processor to the first computing device, access to the second segment.

12. The system of claim 1, wherein the system is operable using less than 6 volts and 300 milliamperes.

13. The system of claim 1, wherein the system is operable using a mobile power source.

14. The system of claim 1, wherein the system comprises a physically integrated component of the public event media system.

15. The system of claim 1, wherein the public event media system comprises a public address system and the public event premises is selected from the group consisting of:

an ice rink, a basketball facility, a theater, a football facility, a soccer facility, a boxing facility, a baseball facility, an equestrian facility, a concert hall, a civic center, a pool, a gymnasium, a dance venue, and a cruise ship.

16. The system of claim 1, wherein the first computing device is one of between 2 and 255 distinct computing devices concurrently connected to the system.

17. A system, comprising:
a processor in communication with a public event media system that is located within a public event premises; and
a non-transitory, computer-readable medium in communication with the processor and storing instructions that, when executed by the processor, cause the processor to perform operations, comprising:
determining, by the processor, that a first computing device remote from the system is authorized to access a first set of media files of a plurality of media files, wherein the access is based on a first identifier associated with the first computing device:
determining, by the processor, that a second computing device remote from the system and distinct from the first computing device is authorized to access a second set of media files of the plurality of media files based on a second identifier associated with the second computing device;
receiving an indication, by the processor, from said first computing device remote from the system, of a selection of a first media file to play for a user from the first set of media files;
receiving, by the processor from the second computing device, a selection by the second user of a second media file from the second set of media files;
authenticating, by the processor, said user based on a second identifier input to said second computing device remote from the system; and
determining, by the processor, a media file play sequence comprising the first media file and the second media file based on an access criteria;
receiving a play request, by the processor, from the second computing device remote from the system;
in response to receipt by the processor of the play request from the authenticated user, providing, by the processor, a first instruction to the public event media system to play the media file play sequence comprising the first media file and the second media file;
wherein the first identifier is associated with a coach account and the second identifier is associated with a student account,
wherein the access criteria comprises an account type condition that prioritizes coach accounts over student accounts, and
wherein the provision of the first instruction is based on the determination of the media file play sequence.

18. The system of claim 1, wherein the operations further comprise:
receiving, by the processor, a second media file of the plurality of media files; and normalizing, by the processor, volume or gain of the second media file.

19. A non-transitory, computer-readable medium storing instructions that, when executed by a processor, cause the processor to perform operations, comprising:
determining, by the processor, that a first computing device remote from the system is authorized to access a first set of media files of a plurality of media files, wherein the access is based on a first identifier associated with the first computing device;
in response to the determination that the first computing device is authorized to access the first set of media files, providing, by the processor, one or more indicators of the first set of media files to the first computing device for presentation on the first computing device;
receiving an indication, by the processor, from said first computing device remote from the system, of a selection of a first media file to play for a user from the first set of media files;
receiving a play request, by the processor, from a second computing device remote from the system;
authenticating, by the processor, said user based on a second identifier input to said second computing device remote from the system; and
in response to receipt by the processor of the play request from the authenticated user from the second computing device, providing, by the processor, a first instruction to play the first computing device selection of the first media file to a public event media system that is located within a public event premises and in communication with the system.

20. A method, comprising:
determining, by a processor of a system, that a first computing device remote from the system is authorized to access a first set of media files of a plurality of media files, wherein the access is based on a first identifier associated with the first computing device;
in response to the determination that the first computing device is authorized to access the first set of media files, providing, by the processor, one or more indicators of the first set of media files to the first computing device for presentation on the first computing device;
receiving an indication, by the processor, from said first computing device of a selection of a first media file to play for a user from the first set of media files;
receiving a play request, by the processor, from a second computing device remote from the system;
authenticating, by the processor, said user based on a second identifier input to said second computing device remote from the system; and
in response to receipt by the processor from the of the play request from the authenticated user, providing, by the processor, a first instruction to play the first computing device selection of the first media file to a public event media system that is located within a public event premises and in communication with the system.

* * * * *